United States Patent [19]

Kosanke

[11] 3,945,419
[45] Mar. 23, 1976

[54] ARRANGEMENT FOR SECURING THE BEADS OF A PNEUMATIC TIRE IN THE RIM THEREFOR

[75] Inventor: Johannes Kosanke, Letter, Germany

[73] Assignee: Continental Gummi-Werke Aktiengesellschaft, Hannover, Germany

[22] Filed: Oct. 21, 1974

[21] Appl. No.: 516,416

[30] Foreign Application Priority Data
Oct. 22, 1973 Germany............................ 2352871

[52] U.S. Cl............. 152/339; 152/158; 152/379 R; 152/330 RF; 152/400; 152/427
[51] Int. Cl.²...................... B60C 5/06; B60C 17/00
[58] Field of Search 152/330 RF, 339, 340, 379–381, 152/399–401, 158

[56] References Cited
UNITED STATES PATENTS

| 1,538,202 | 5/1925 | Moore | 152/400 |
| 2,169,041 | 8/1939 | Gammeter | 152/339 |
| 2,253,746 | 8/1941 | Zimmerman | 152/339 |
| 2,552,336 | 5/1951 | Marcum | 152/400 |
| 2,554,815 | 5/1951 | Church | 152/339 |
| 2,680,463 | 6/1954 | Khalil | 152/339 |

Primary Examiner—Drayton E. Hoffman
Attorney, Agent, or Firm—Walter Becker

[57] ABSTRACT

An arrangement for securing the beads of a pneumatic tire in the rim therefor, according to which an annular inflatable body is located in the interior of the beaded pneumatic tire which inflatable body in non-inflated or in only slightly inflated condition has an inner diameter greater than the diameter defined by the seating surfaces of the tire. The annular inflatable body has two reinforcing layers respectively including thread-shaped elements inclined in a left hand and right hand way so as to cross each other. The arrangement is such that in non-inflated condition of the inflatable body the thread-shaped elements form with the circumferential direction of the tire an angle of from approximately 23° to 32°.

8 Claims, 6 Drawing Figures

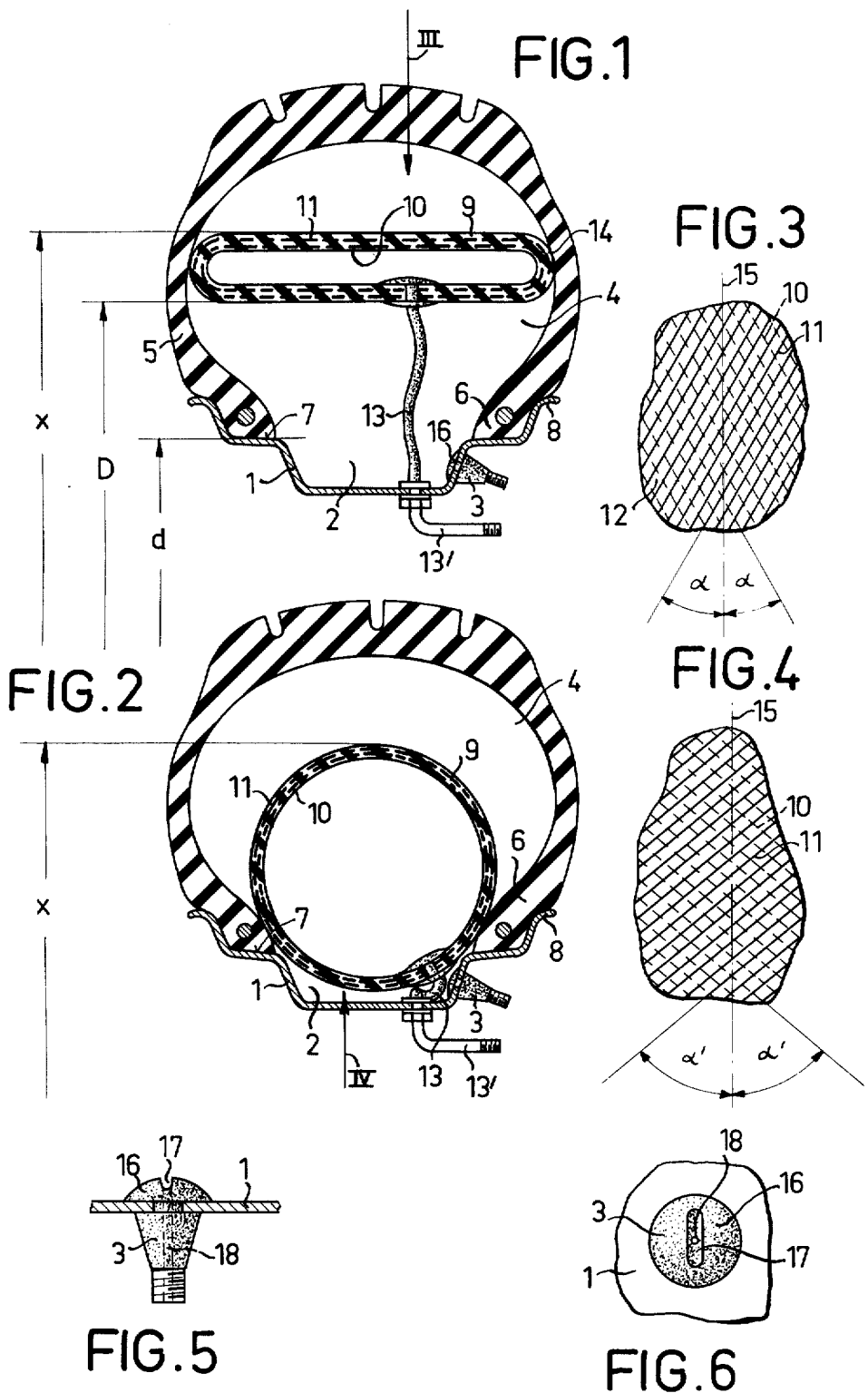

ARRANGEMENT FOR SECURING THE BEADS OF A PNEUMATIC TIRE IN THE RIM THEREFOR

The present invention relates to an arrangement for securing the tire beads with vehicle wheels which are equipped with an annular inflatable body located between the beads and which receive a pneumatic tire.

With heretofore known devices of the above mentioned type, difficulty is encountered in assembling the inflatable body. This is due to the fact that this inflatable body, at least at its outer circumference, has a reinforcing insert which is non-expandable in the tire circumferential direction. This reinforcing insert is intended to prevent an enlargement of the inflatable body at increased inner pressure. These inserts require a divided rim or at least a special skill in order to be able properly to mount the inflatable body.

It is an object of the present invention to provide means for securing the position of the inflatable body which in the operative position of the inflatable body will exert a sufficiently high pressure against the tire beads to be secured. It is another object of this invention to provide securing of the inflatable body in the tire in such a way that when the beads are mounted on their seats, the inflatable body will not interfere and will be able without difficulties to occupy its required position of use.

These and other objects and advantages of the invention will appear more clearly from the following specification in connection with the accompanying drawings, in which:

FIG. 1 illustrates a radial section through a vehicle wheel with a tire having an inflatable body therein occupying its rest position.

FIG. 2 shows the wheel according to FIG. 1 with an inflatable body in its operative position.

FIG. 3 is a top view of the reinforcing inserts of the inflatable body according to FIG. 1, seen in the direction of the arrow III.

FIG. 4 is a top view of the reinforcing inserts of the inflatable body according to FIG. 2, seen in the direction of the arrow IV.

FIG. 5 is a partial section through the rim for the vehicle wheel according to FIG. 1 and more specifically is taken within the region of the filling valve.

FIG. 6 is a top view of the filling valve according to FIG. 5.

The arrangement according to the present invention is characterized primarily in that the inflatable body in noninflated or only slightly inflated condition has an inner diameter which is greater than the diameter determined by the seating surfaces on the rim for the tire. The arrangement according to the invention is furthermore characterized in that the thread-shaped reinforcing inserts which cross each other and ascend in lefthand and righthand direction while being arranged at least nearly symmetrically with regard to the tire circumferential direction, confine in non-inflated condition of the inflatable body at the outer circumference thereof with the tire circumferential direction an angle of from 23° to 32°, preferably an angle of about 26°.

The invention is based on the finding that a mounting of the inflatable body can be best carried out when the inflatable body during the mounting operation is located outside the region of the rim seat surfaces, preferably in the upper portion of the hollow tire chamber. In addition thereto, in conformity with the present invention there is an inflatable body provided which only with the introduction of a pressure fluid into the inflatable body changes from the above mentioned diameter range to a smaller diameter range whereby the desired pressing of the tire beads is effected. Since the inflatable body comprises the above mentioned reinforcing inserts intercrossing at an angle of from approximately 23° to 32°, the inflatable body will when introducing thereinto a pressure fluid, have its reinforcing inserts influenced in such a way that their intercrossing angle increases. The inflatable body will during this operation reduce its inner diameter until the reinforcing inserts within said diameter range eventually confine with the tire circumferential direction an angle of from 48° to 56°. Thus, care has to be taken that when this angle has been reached or the inherent reduction in diameter has occurred, the inflatable body passes from its rest position to its position of use and thus brings about the desired pressing of the tire beads. In this connection it is to be understood that the inflatable body not only secures the tire beads but also serves as emergency ring if the tire should have been damaged.

Referring now to the drawings in detail, the rim 1 of the vehicle wheel is in the manner known per se equipped with a depressed bed 2 to which is connected the filling valve 3 for the tire chamber 4 of the pneumatic tire 5 which consists primarily of rubber or rubber-like material and is equipped with beads 6. The tire seat surfaces 7 are laterally outwardly confined by the outwardly curved rim portions 8.

Within the tire chamber 4 there is provided an annular inflatable body 9 which extends over the entire tire circumference. The inflatable body 9 consists primarily of rubber or rubber-like materials and is equipped with reinforcing inserts having the form of two superimposed cord fabric layers 10, 11 which in their turn consist of pull-resistant thread-shaped strength carriers 12 of textile material, steel or the like.

The connection for the fluid medium for the inflatable body 9 is formed by a flexible elastic hose designated with the reference numeral 13 and leading to the bed 2 of the rim 1. This fluid connection may be designed in any convenient manner.

The strength carriers 12 of the two layers 10, 11 are symmetrically arranged with regard to the tire circumferential direction and the circumferential direction 15 of the inflatable body 9. The angles of ascent for the strength carriers 12 of the two layers 10, 11 are designated with the character $\alpha$. The angle $\alpha$ amounts to from about 23° to 32°, preferably amounts to about 26°.

When the tire 5 together with the inflatable body 9 has been brought into the position shown in FIG. 1, the inflatable body 9 is subjected to an inner pressure through hose 13 having its outer end provided with a valve 13'. As a result thereof the angle $\alpha$ increases at its inner diameter while simultaneously maintaining its outer diameter X. At the same time, the inner diameter D of the inflatable body 9 decreases, and the cross section of the inflatable body 9 will slightly increase. With the decrease in diameter, the inflatable body 9 engages the inside of the tire beads 6 so that also under an extreme curve load, the tire bead 6 will be secured against slipping off from the tire seat surfaces, 7. The diameter X of the inflatable body 9 according to FIGS. 1 and 2 is so dimensioned that with the decrease in the diameter D to the final position shown in FIG. 2, the angle $\alpha'$ according to FIG. 4 assumes a value of approximately from 48° to 56°, especially an angle of 52°.

According to FIG. 1, the inflatable body 9 has an inner diameter D which is considerably greater than the diameter d of the tire seat surfaces 7. The diameter D is even greater than the outer diameter of the rim within the region of the rim portions 8, and more specifically, in such a way that the inflatable body 9 is still located in the upper portion of the hollow tire chamber 4 within the region of the side walls of the tire.

As will be seen from FIG. 2, the inflatable body 9 will due to the automatically occurring decrease in diameter D pass into the depressed bed 2.

In order to assure that the inflatable body 9 entering the depressed bed 2 will permit the operation of the filling valve 3, that part 16 of the filling valve 3 which extends into the hollow chamber 4 has a depression in the form of a slot 17. The inflatable body 9 which, as the case may be, rests against the part 16 will thus not be able to close the passage 18 of the filling valve 3.

With regard to the inflation of the inflatable body 9 and the deformation thereof inherent thereto, it may be added that when inflating said inflatable body 9 under the above outlined conditions, the outer circumferential diameter X of the inflatable body 9 does not increase, and only the inner diameter D decreases in the desired manner so that the inner diameter portion of the inflatable body 9 will with certain portions thereof rest and press against the tire beads 6. It is for realizing this effect that, similar to pneumatic tires, the strength carriers 12 of the two layers 10 and 11 are provided which extend in two different directions as outlined above.

It will be appreciated that during the inflation of the inflatable body 9, the diameter of said inflatable body 9 will change in conformity with the respective angle position of the strength carriers. The individual strength carriers 12 of the layers 10, 11 absorb certain thread forces which depend on the respective angle positions of the strength carriers. Under the above mentioned conditions, i.e., at the above mentioned angles of from 23° to 32° at the diameter X the thread forces in the strength carriers 12 of layers 10 and 11 become so high that in this area no increase in diameter occurs but only a decrease in the inner diameter of the inflatable body 9. This phenomenon always depends on the positions of the cord threads which latter are not expanded or stretched but retain their length, whereas all changes in diameter occur in conformity with the decrease or increase in the angle which the cord threads 12 form with each other. In this way, conditions are obtained as they occur with so-called "Nuremberg scissors".

As to the above mentioned angle changes, it may be emphasized that at the zenith circumferential line of the inflatable body 9, the angle α does not change. Changes in the angle can occur only with changing diameters. Where the diameter X is measured in FIGS. 1 and 2, the angles have in both instances the value α. In all other diameter regions according to FIG. 2, said angles increase.

It may, furthermore, be mentioned that in operative condition according to FIG. 2, a higher pressure must, of course, prevail within the inflatable body 9 than will occur in the tire chamber 4.

It is, of course, to be understood that the present invention is, by no means, limited to the specific showing in the drawing but also comprises any modifications within the scope of the appended claims.

What I claim is:

1. In combination with a wheel rim having seating surfaces for tire beads, and with a pneumatic vehicle tire with beads mounted on said rim: an annular inflatable body arranged within said tire and provided with reinforcing thread-shaped intercrossing members respectively ascending in left hand and right hand direction and respectively defining two superimposed layers embedded in said inflatable body, and arranged at least approximately symmetrically with regard to the circumferential direction of said tire, said inflatable body when in approximately non-inflated condition having an inner diameter which is greater than the diameter defined by the seating surfaces of said rim for the tire beads while said thread-shaped members of each of said superimposed layers in said approximately non-inflated condition define with the circumferential direction of said tire an angle of from 23° to 32° as to outer periphery entirely, said inflatable body when in inflated condition pressing the tire beads against the outer rim portions, the inflatable body at its outer diameter extending to the tire circumferential direction at such an angle that said outer diameter of said inflatable body will during the inflation of the latter practically be retained while its inner diameter will be reduced to such an extent that the inflatable body in inflated condition rests under pressure against said tire beads.

2. An arrangement in combination according to claim 1, in which said inflatable body in approximately non-inflated condition has such an inner diameter that the reinforcing thread-shaped members of said superimposed layers in said inflated condition define with the circumferential direction of the tire an angle of approximately from 48° to 56°.

3. An arrangement in combination according to claim 1, in which the inner diameter of said inflatable body in approximately non-inflated condition of said inflatable body is greater than the maximum outer diameter of said rim.

4. An arrangement in combination according to claim 1, in which said inflatable body in approximately non-inflated condition is located in the radially outer portion of the inner air receiving chamber of the pneumatic tire.

5. An arrangement in combination according to claim 1, which includes elastic flexible hose means leading from the outside through said rim into said inflatable body for conveying pressure fluid into said inflatable body.

6. An arrangement in combination according to claim 1, which includes a filling valve supported by said rim and extending from the outside of said rim into the interior of the latter, said valve including an axial passage therethrough leading from the outside of said valve into the interior of said rim and also including a transverse passage arranged on the inside of said valve and extending transverse to said axial passage and communicating with the interior of said rim.

7. An arrangement in combination according to claim 1, in which said inflatable body has a substantially circular cross section and in inflated condition partially extends into a portion of said rim.

8. An arrangement in combination according to claim 1, in which the inflatable body at its outer diameter extends to the tire circumferential direction at such an angle of approximately 26°.

* * * * *